(12) United States Patent
Kuhn et al.

(10) Patent No.: US 7,311,172 B2
(45) Date of Patent: Dec. 25, 2007

(54) STRADDLE CARRIER WITH POWER STEERING

(75) Inventors: Rolf Kuhn, Wuerzburg (DE); Reinhard Bauer, Remlingen (DE)

(73) Assignee: Noell Mobile Systems & Cranes GmbH, Wuerzburg (DE)

( * ) Notice: Subject to any disclaimer, the term of this patent is extended or adjusted under 35 U.S.C. 154(b) by 0 days.

(21) Appl. No.: 11/067,781

(22) Filed: Feb. 28, 2005

(65) Prior Publication Data

US 2006/0124381 A1 Jun. 15, 2006

(30) Foreign Application Priority Data

Dec. 11, 2004 (DE) .................. 10 2004 059 751

(51) Int. Cl.
*B62D 5/00* (2006.01)
*B62D 5/04* (2006.01)
*B62D 5/06* (2006.01)

(52) U.S. Cl. ............... 180/402; 180/403; 180/417; 180/443

(58) Field of Classification Search .......... 180/402, 180/403, 417, 421, 422, 443, 444, 446; 701/41–43
See application file for complete search history.

(56) References Cited

U.S. PATENT DOCUMENTS

| 4,457,389 | A | * | 7/1984 | Voelz | 180/415 |
| 6,076,627 | A | * | 6/2000 | Bohner et al. | 180/422 |
| 6,206,127 | B1 | * | 3/2001 | Zakula et al. | 180/236 |
| 6,269,903 | B1 | * | 8/2001 | Bohner et al. | 180/406 |
| 6,594,569 | B2 | * | 7/2003 | Yasuda | 701/41 |
| 6,693,405 | B2 | * | 2/2004 | Blanke et al. | 318/801 |
| RE38,632 | E | * | 10/2004 | Schmidt et al. | 701/41 |

FOREIGN PATENT DOCUMENTS

DE 203 11 886 11/2003

* cited by examiner

*Primary Examiner*—Lesley D. Morris
*Assistant Examiner*—Marc A. Scharich
(74) *Attorney, Agent, or Firm*—Darby & Darby

(57) ABSTRACT

A steering system for a straddle carrier includes two side supports with steerable wheels, braces, a hoisting gear, an an upper frame. An operator's cab having a steering wheel is disposed at the upper frame. A servo motor with an inverter is mounted in operative connection with the steering wheel and that operates in four quadrants. The servo motor steers the wheels of the straddle carrier using a steering computer, hydraulic proportional valves, control cylinders, and potentiometers on the side supports.

11 Claims, 2 Drawing Sheets

STRADDLE CARRIER WITH POWER STEERING

Priority is claimed to German Patent Application No. DE 102004059751.0, filed on Dec. 11, 2004, the entire disclosure of which is incorporated by reference herein.

The present invention relates to a straddle carrier with power steering according to the first patent claim. The invention can be used for traveling gantries, so-called straddle loaders.

BACKGROUND

Straddle carriers are employed in harbors and container terminals to transport and stack containers. They are usually steered hydraulically, that is to say, their diesel engine drives a hydraulic pump that forces oil out of a tank via control valves into hydraulic cylinders which use a steering linkage to make the wheels of the vehicle move into certain steering positions.

A straddle loader with an electric wheel drive is described in German publication DE 203 11 886.3, the entire disclosure of which is incorporated by reference herein, although no mention is made of the steering of the straddle loader.

The hydraulic steering consists of a hydraulic system with a pump, cylinder, valve block, oil tank and tubing on the vehicle.

So-called steering force simulators are known for the steering of such straddle carriers. They simulate an increasing force on the operator's steering wheel when the travel on the steering wheel becomes excessively large in comparison to the actual displacement of the wheels in order to call attention to the occurrence of over-steering. Steering force simulators are available in a purely hydraulic version or else with electric solenoid brakes. Owing to the structure of the straddle carrier and to the arrangement of the operator's cab, purely hydraulic steering systems of the type known for straddle carriers have the drawback that many tubes and hoses are needed which, on the one hand, cause a considerable delay and, on the other hand, are a source of frequent malfunctions. Consequently, purely hydraulic steering systems are not practical for straddle carriers. The disadvantage of the known electric systems is that the steering force is generated by means of a solenoid brake with a friction lining. This friction lining has the drawback that the wear and tear on the brake lining causes a change in the braking torque so that readjustments have to be made frequently. Thus, maintenance work has to be carried out in a workshop, which restricts the availability of the vehicle. Another disadvantage of such a system is that, when the operator reverses the direction of movement, slack or play occurs in the steering force simulator which does not affect the steering operation but it does give an unpleasant steering feel to the operator. The same type of slack is also known with conventional hydraulic steering systems.

SUMMARY OF THE INVENTION

An objective of the present invention is to provide a straddle carrier that gives the operator a precise, automotive steering feel while also preventing slack or play, and obviating the need for long, defect-prone hydraulic lines and lessening the maintenance work required.

The present invention provides a steering system for a straddle carrier having two side supports with steerable wheels, braces, a hoisting gear, and an upper frame having an operator's cab. The steering system includes a steering wheel disposed in the operators cab; a steering computer; a plurality of hydraulic proportional valves; a plurality of control cylinders each disposed at one of the two side supports; at least one potentiometer disposed at one of the two side supports; and a servo motor disposed in operative connection with the steering wheel and having an inverter, the servo motor operating in four quadrants and configured to steer the steerable wheels using the steering computer, the hydraulic proportional valves and the control cylinders.

The solution according to the invention proposes a straddle carrier with power steering in which a brushless servo motor with an adjustable inverter is mounted on the steering wheel and it works in four quadrants, that is to say, it can drive or brake in both rotational directions. As a result, the above-mentioned braking forces are simple to effectuate and the operator has an automotive steering feel. Moreover, the steering system is reset to the position for driving straight ahead as a function of the speed so that, like with a passenger car, when the vehicle is at a standstill (speed of zero), the resetting speed is likewise zero. However, as the speed increases, the resetting speed rises to a value that is adapted to the steering system, which results in a realistic automotive steering feel. During this resetting, however, the operator can still hold onto the steering wheel and thus retain complete control over the vehicle. This system does not entail any slack. The system is designed with two channels, in other words, it has two set-point transmitters for the steering wheel position, two actual-value transmitters for the wheel position (steering angle) and two electromagnetic proportional valves as final control elements for the hydraulic cylinders. In this manner, redundancy exists for all of the important functions of the steering system, which renders them fail-safe. From the set-point transmitters on the servo motor, the two set-point signals reach the steering computer, whose software then compares them to the actual-value signals from the steering-angle transmitters, after which the software uses a control algorithm to calculate actuating signals that are then output to the hydraulic proportional valves. These valves, in turn, regulate the flow of oil into the control cylinders for the wheels; there is one cylinder on each side support. The wheels of one side can be linked to each other via connecting rods so that one control cylinder can steer several wheels (steering linkage).

Likewise connected to the steering computer is another computer which, as a function of the steering angle and taking into account the actual center of gravity, limits the driving speed of the straddle carrier in such a way that it cannot tip over.

Examples of useable steering computers and anti-tip computers are portable, sturdy industrial computers (controllers) or stored program control units (SPC).

The oil circulation system is connected to an emergency supply and to an oil pan. Moreover, there is an emergency steering mechanism for the eventuality that the steering computer should fail. The hydraulic system of each side support is connected to the hydraulic system of each of the other side supports.

Occurring errors are shown to the operator on the display in different error categories. These are the following:

Category 0: steering system is operational;
Category 1: indication of checking procedure, warning of impermissible operating state;

Category 2: indication of immediate checking procedure, which is the case when a redundant component has failed; it is possible to drive to the workshop slowly using the second component.

Category 3: failure of a non-redundant component, thus immediate shutdown of the system; instructions given for use of the emergency steering system and summoning of a technician.

BRIEF DESCRIPTION OF THE DRAWINGS

The present invention is elucidated below with reference to an embodiment and to the drawings, in which.

DETAILED DESCRIPTION

Figure 1:
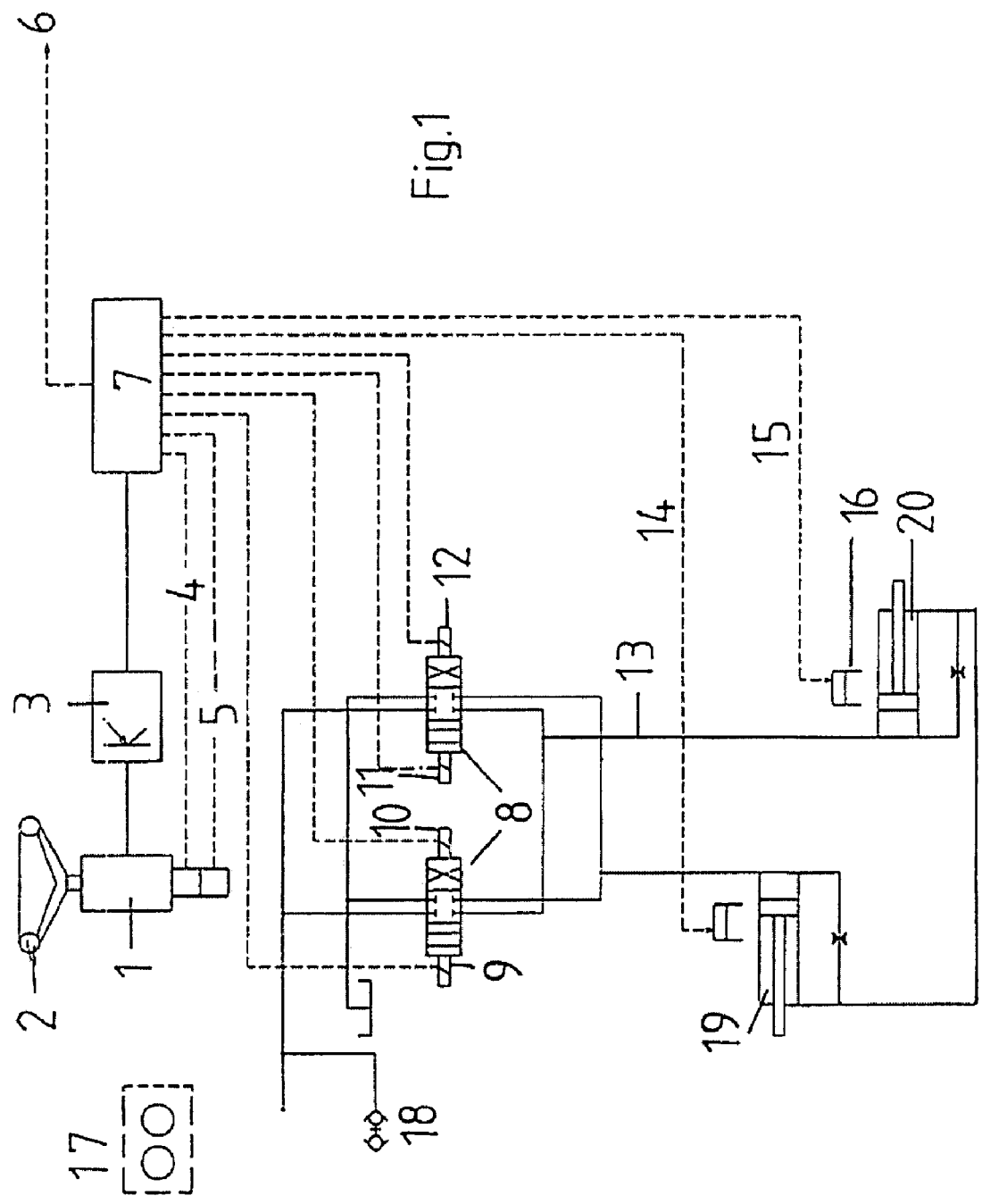
FIG. 1 shows a steering system of the straddle carrier in a functional view.

FIG. 1 shows the steering wheel 2 with the servo motor 1 which is connected to an inverter 3 and from which the set-point 1 and the set-point 2, 4, 5 reach the steering computer 7. This steering computer 7 then informs the anti-tip computer 6 about the steering angle, so that protection against tipping over is ensured at all times. Moreover, the steering computer 7 is connected via four magnets 9, 10, 11, 12 to two hydraulic valves 8. By means of the oil in the hydraulic lines 13, these hydraulic valves 8 can adjust the control cylinders 19, 20 on the two side supports. The oil circulation systems of the control cylinders 19, 20 are connected to each other. There is also an emergency supply 18 and an oil pan. The actual values 14, 15 of the wheel positions are picked up by two potentiometers 16 and transmitted to the steering computer 7. Should a redundant component fail, this is shown on the operator's display. If the entire system shuts down, the emergency steering system 17, which functions independently of the described steering system, can be used.

The system shown is designed with two channels. There are two set-point transmitters, each with two tracks, as well as two actual-value transmitters, each with two potentiometers on the steering linkage. The steering computer is configured according to DIN V 19250 in the Requirement Class (AK) 4 in accordance with EN 954-1 in Category 3.

Figure 2:
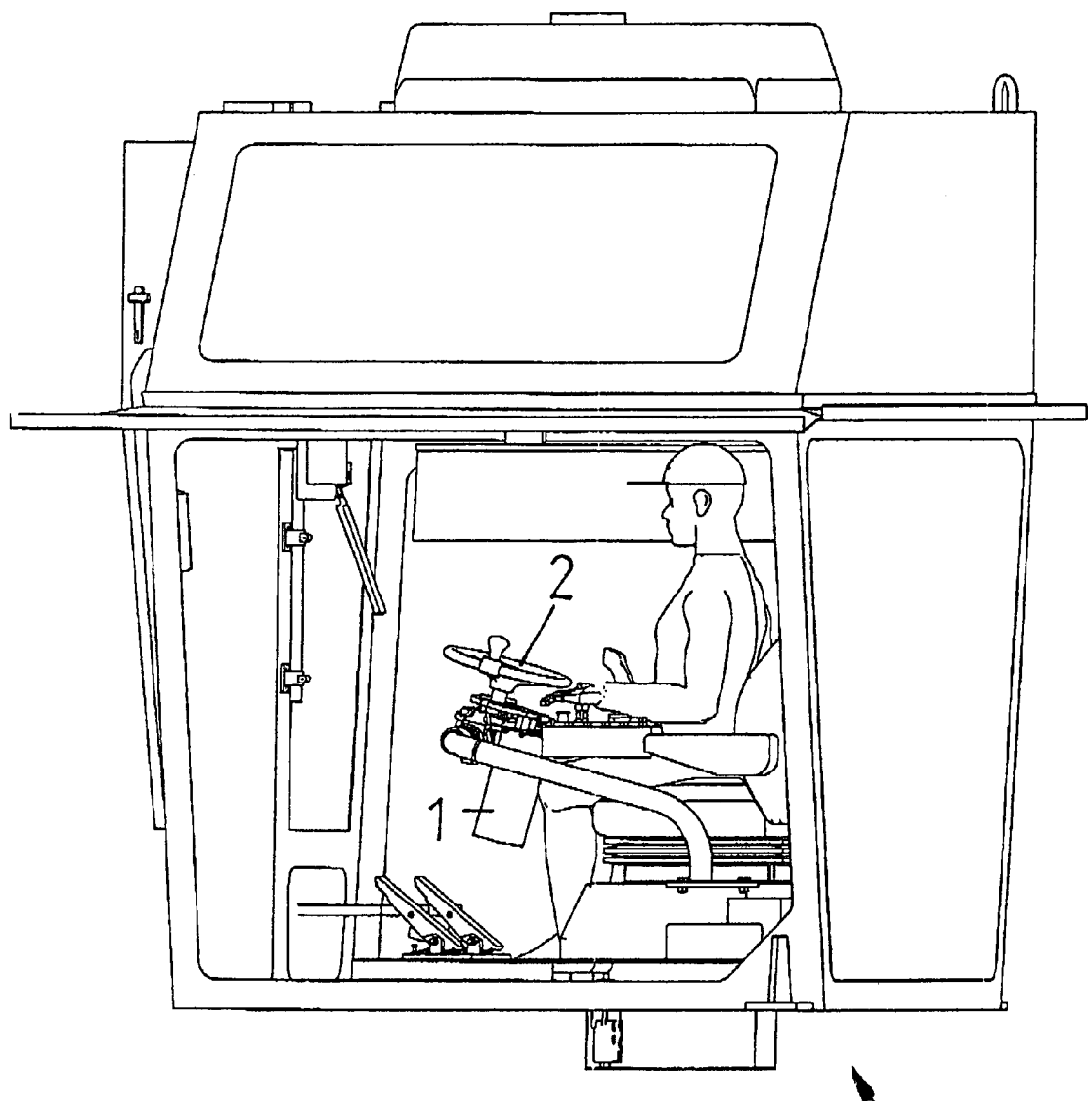
FIG. 2 shows a driving cab with operator and steering wheel with servo motor.

FIG. 2 shows the operator's cab 21 with the operator, the steering wheel 2 and the servo motor 1.

LIST OF REFERENCE NUMERALS USED 1 servo motor
2 steering wheel
3 inverter
4 set point 1
5 set point 2
6 steering angle signal to the anti-tip computer
7 steering computer
8 hydraulic proportional valve
9 magnet 1
10 magnet 2
11 magnet 3
12 magnet 4
13 hydraulic line
14 actual value 1
15 actual value 2
16 potentiometer
17 emergency steering system
18 emergency supply
19 control cylinder on side support 1
20 control cylinder on side support 2
21 driving cab of a straddle carrier

What is claimed is:

1. A steering system for a straddle carrier having two side supports with steerable wheels, braces, a hoisting gear, and an upper frame having an operator's cab, the steering system comprising:
   a steering wheel disposed in the operator's cab;
   a steering computer;
   a plurality of hydraulic proportional valves;
   a plurality of control cylinders each disposed at one of the two side supports;
   at least one potentiometer disposed at one of the two side supports; and
   a servo motor disposed in mechanical connection with the steering wheel and having an inverter, the servo motor operating in four quadrants and configured to steer the steerable wheels using the steering computer, the hydraulic proportional valves and the control cylinders.

2. The steering system for a straddle carrier as recited in claim 1, wherein the servo motor works maintenance-free.

3. The steering system as recited in claim 2, wherein the steering computer transmits a steering angle to an anti-tip computer configured to limit a speed using a stored program control unit (SPC) so as to prevent the straddle carrier from tipping over.

4. The steering system as recited in claim 3, wherein the at least one potentiometer sends a signal corresponding to an actual value of the steering angle for a position of each wheel to the steering computer, and the steering computer sends a set-point signal to at least one of the hydraulic proportional valves, and the at least one hydraulic proportional valve actuates at least one of the control cylinders using a hydraulic line.

5. The steering system as recited in claim 4, wherein the at least one hydraulic proportional valve includes at least two magnets.

6. The steering system as recited in claim 4, wherein at least one hydraulic proportional valve includes two hydraulic proportional valves redundantly provided for two control cylinders and two potentiometers.

7. The steering system as recited in claim 6, wherein the steering system includes two feedback and control channels for feedback and control of the steering system.

8. The steering system as recited in claim 6, wherein the steering computer is configured to reset the steering system to a position for driving straight ahead as a function of a speed of the straddle carrier.

9. The steering system as recited in claim 1, further comprising an operator's display disposed at the operator's cab and configured to display operating states of the steering system.

10. The steering system as recited in claim 9 wherein the operating states include at least one of:
   a first state indicating that the steering system is operational;
   a second state warning of an impermissible operating state;
   a third state indicating a failure of a redundant component;
   a fourth state indicating a shutdown of the system with instructions for use of an emergency steering system.

11. A straddle carrier having a power steering system as recited in claim 1.

* * * * *